United States Patent
Gilbert et al.

(10) Patent No.: US 6,901,531 B2
(45) Date of Patent: May 31, 2005

(54) AUTOMATIC SYSTEM CONTROL FAILOVER

(75) Inventors: Gary L. Gilbert, San Diego, CA (US); Cathleen Quick, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 599 days.

(21) Appl. No.: 09/998,019

(22) Filed: Nov. 30, 2001

(65) Prior Publication Data

US 2003/0105987 A1 Jun. 5, 2003

(51) Int. Cl.⁷ ............................................... G06F 11/00
(52) U.S. Cl. ............................ 714/5; 714/6; 714/9
(58) Field of Search .................................. 714/5, 6, 9

(56) References Cited

U.S. PATENT DOCUMENTS

| | | | | |
|---|---|---|---|---|
| 5,070,477 A | * | 12/1991 | Latif et al. ........................ 710/21 |
| 5,832,222 A | * | 11/1998 | Dziadosz et al. ............ 709/216 |
| 6,009,535 A | * | 12/1999 | Halligan et al. ................. 714/5 |
| 6,742,139 B1 | * | 5/2004 | Forsman et al. ................ 714/23 |
| 2003/0061326 A1 | | 3/2003 | Gilbert et al. |
| 2003/0084373 A1 | | 5/2003 | Phelps et al. |
| 2003/0097556 A1 | | 5/2003 | Gilbert et al. |

* cited by examiner

*Primary Examiner*—Robert Beausoliel
*Assistant Examiner*—Timothy M. Bonura
(74) *Attorney, Agent, or Firm*—Meyertons Hood Kivlin Kowert & Goetzel, P.C.

(57) ABSTRACT

A method, device, and system for automatic fail over of system controllers. A system controller includes a processor, a memory, and a plurality of I/O controllers. Each I/O controller is configurable with a plurality of I/O connections to another system controller. Each of the plurality of I/O controllers is further configurable with an I/O connection to each of one or more monitored devices. The method includes booting a plurality of system controllers configured as a primary system controller and at least one secondary system controller and booting one or more domains in the computer system from the primary system controller. The method also includes updating a system configuration on the primary system controller and updating the system configuration on the secondary system controller from the primary system controller.

26 Claims, 8 Drawing Sheets

AUTOMATIC SYSTEM CONTROL FAILOVER

BACKGROUND OF THE INVENTION

1. Field of the Invention

This invention relates generally to computer systems, and, more particularly, to a method and apparatus for providing automatic failover for system controllers, such as in a multi-domain computer system.

2. Description of the Related Art

Network computing has increased dramatically over the past several years due in part to the emergence of the Internet. Some trends in the industry include a significant growth in Applications Service Providers (ASPs) that provide applications to businesses over networks that use the Internet, for example, to distribute product data to customers, take orders, and enhance communications between employees.

Typically, businesses rely on network computing to maintain a competitive advantage over other businesses. As such, developers typically take several factors into consideration to meet the customer's expectation when designing processor-based systems for use in network environments. Such factors, for example, may include functionality, reliability, scalability and the performance of these systems.

One example of a processor-based computer system used in a network environment is a mid-range server. A single mid-range server may be configured for a plurality of domains, where each domain may act as a separate machine by running its own instance of an operating system to perform one or more of the configured tasks.

The benefits of providing near-independent domains within an integrated system are readily apparent, as customers are able to perform a variety of tasks that would otherwise be reserved for several different machines. Because these domains typically share some of the computer system's resources, when one domain ceases to function properly, it may adversely affect the operation of the other domain(s). As such, reliability in the control of the domain (s) and selected other functions within the computer system may be a high priority.

SUMMARY OF THE INVENTION

In one aspect of the present invention, a system controller is provided. The system controller includes a processor, a memory, and a plurality of input/output (I/O) controllers. Each I/O controller is configurable with a plurality of I/O connections to another system controller. Each of the plurality of I/O controllers is further configurable with an I/O connection to each of one or more monitored devices.

In another aspect of the present invention, a computer system is provided. The computer system includes one or more sensors, one or more processors, one or more memories, one or more I/O devices, and a plurality of system controllers. Each system controller includes a processor, a memory, and a plurality of I/O controllers. Each I/O controller is configurable with a plurality of I/O connections to another of the plurality of system controllers. Each of the plurality of I/O controllers is further configurable with an I/O connection to each of one or more sensors. The plurality of system controllers includes a primary system controller and a secondary system controller. The primary system controller is configured to configure the one or more processors, the one or more memories, and the one or more I/O devices into one or more domains. The primary system controller is further configured to update secondary system controller with a system configuration.

In still another aspect of the present invention, another computer system is provided. This computer system includes a plurality of sensors, a center plane, one or more processor boards coupled to the center plane, one or more I/O boards coupled to the center plane, and a plurality of system controllers each coupled to the center plane, the one or more processor boards, and the one or more I/O boards. Each of the plurality of system controllers includes a plurality of I/O controllers. Each I/O controller is configurable with a plurality of I/O connections to a different system controller. Each I/O controller is further configurable with an I/O connection to each of the plurality of sensors.

In yet another aspect of the present invention, a method of operating a computer system is provided. The method includes booting a plurality of system controllers configured as a primary system controller and at least one secondary system controller and booting one or more domains in the computer system from the primary system controller. The method also includes updating a system configuration on the primary system controller and updating the system configuration on the secondary system controller from the primary system controller.

BRIEF DESCRIPTION OF THE DRAWINGS

The invention may be understood by reference to the following description taken in conjunction with the accompanying drawings, in which like reference numerals identify like elements, and in which.

Figure 1:
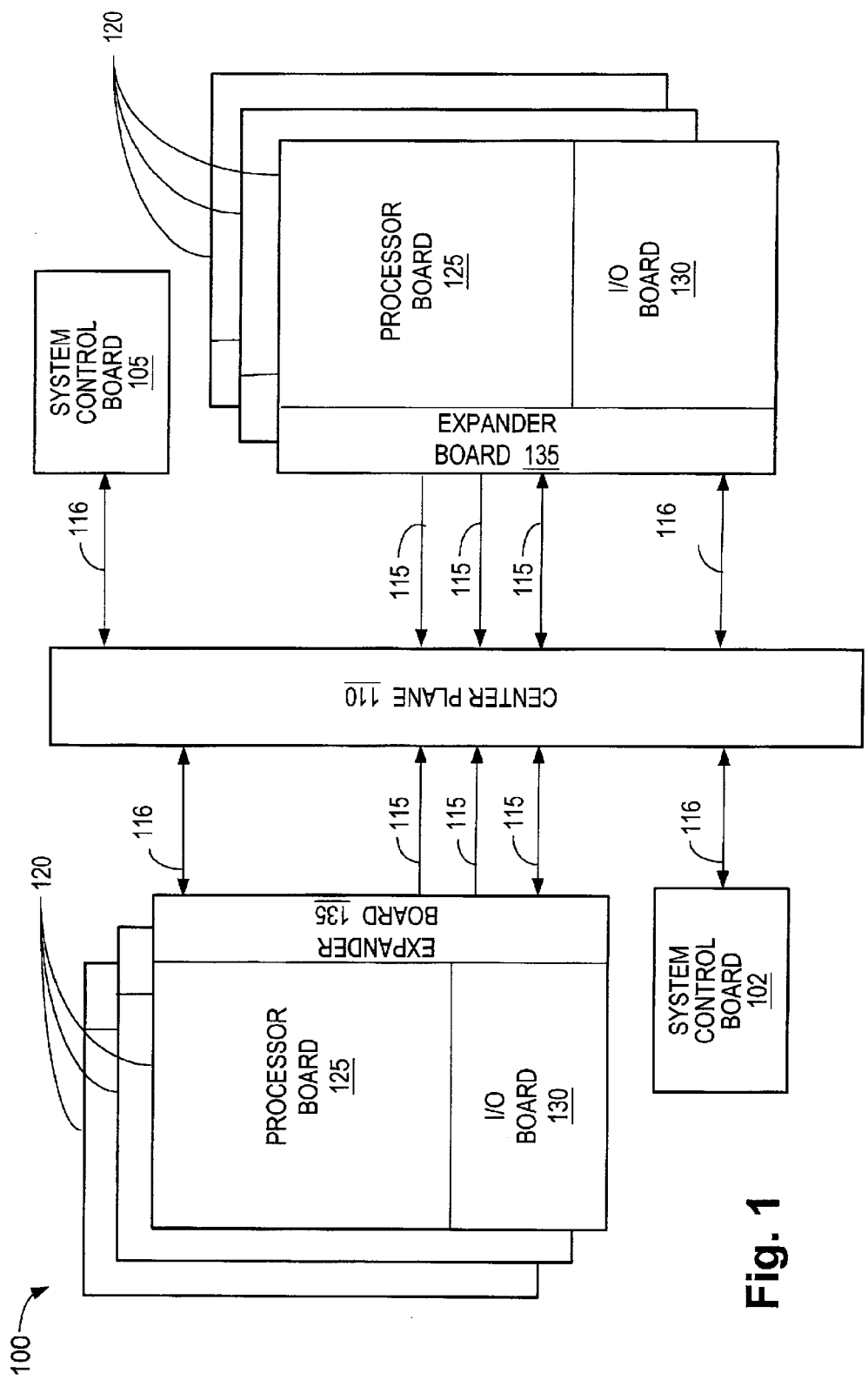
FIG. 1 illustrates a block diagram of a multi-domain computer system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a simplified block diagram of a computer system 100, according to one embodiment of the present invention, is shown. The computer system 100 comprises a pair of system control boards 102, 105 coupled through a center plane 110 (e.g., a back plane or a switch) via a plurality of respective communication links 116 to a plurality of system board sets 120. In one embodiment, the communication links 116 take the form of edge connectors for making electrical or optical connections. It will be appreciated, however, that the communication links 116 may alternatively take the form of cables or various other types of interfaces without departing from the scope of the present invention.

According to the illustrated embodiment, one of the system control boards 102 serves as the "primary" system control board for providing system controller resources for the computer system 100 and managing the overall operation thereof. Another "secondary" system control board 105, which may be functionally and/or structurally identical to the primary system control board 102, serves as a backup for managing the system 100 if the primary system control board 102 fails or is otherwise made unavailable. Each system controller board 102, 105 provides several services to the computer system 100. These services may include master clock generation and control, domain initialization, configuration, and reconfiguration, electrical power control, system component failover control, and user notification and interfacing. Thus, the plurality of communications links 116 provides monitor and control signals between the system control boards 102, 105 and the plurality of system board sets 120.

The computer system 100 further includes the plurality of system board sets 120 coupled to the center plane 110 via a plurality of respective communication links 115. The communication links 115 include data links and address links. In one embodiment, the communication links 115 take the form of edge connectors for making electrical or optical connections. It will be appreciated, however, that the communication links 115 may alternatively take the form of cables or various other types of interfaces without departing from the scope of the present invention.

The system board sets 120 each comprise one or more boards, which may include a processor board 125, an I/O board 130, and an expander board 135. The processor board 125, for example, may include a plurality of processors and/or memories for executing various computing tasks. The I/O board 130 may manage I/O cards, such as peripheral component interface (PCI) cards and optical cards that are installed in the system 100 for connection to various I/O devices (not shown).

According to the illustrated embodiment, the expander board 135 allows both the processor board 125 and I/O board 130 to interface with the center plane 110. In accordance with one embodiment, the computer system 100 may include up to eighteen expander boards 135, with each expander board 135 having a slot for accommodating a single processor board 125 and a single I/O board 130, for thirty-six boards 125, 130. It will be appreciated that the expander board 135 may alternatively be configured to accommodate various arrangements of processor boards 125 and I/O boards 130. For example, the expander board 135 may be alternatively configured to accommodate two processor boards 125 or two I/O boards 130, instead of one processor board 125 and one I/O board 130 as shown in FIG. 1, without departing from the scope of the present invention. Additionally, it will be appreciated that the computer system 100 may be configured with a greater or fewer numbers of boards 125, 130, 135 than provided in the examples above without departing from the scope of the present invention.

The center plane 110 serves as a communication medium for the plurality of system board sets 120 and system control boards 102, 105 to communicate with one another. According to one embodiment, the center plane 110 takes the form of a plurality of 18×18 crossbars to accommodate communications between the thirty-six boards 125, 130. Accordingly, the center plane 110 may permit the two system control boards 102, 105 to communicate with each other or with other system board sets 120, as well as allow the system board sets 120 to communicate with each other.

In accordance with one embodiment of the present invention, the system resources (e.g., processor boards 125, I/O boards 130) of the computer system 100 may be dynamically subdivided under the control of the system controller boards 102, 105 into a plurality of system domains, where each domain may have a separate boot disk to execute a specific instance of an operating system, separate and/or shared disk storage, network interfaces, and/or I/O interfaces. Each domain may essentially operate as a separate machine that performs a variety of user-configured services. For example, one or more domains may be designated as an application server, a web server, database server, etc. Alternatively, each domain may be allocated to a specific department within a company or organization. For example, one domain may be allocated to a marketing department and another domain may be allocated to an accounting department to accommodate their respective computing needs. Alternatively, the computer system 100 may be shared by a few smaller companies or organizations through a computer service company, where it would otherwise be impractical for any one company or organization to purchase and maintain the computer system 100. Thus, each such company or organization could be allocated a specific grouping of system resources from the system 100 (i. e., allocated one or more domains) for their individual use.

Figure 2:
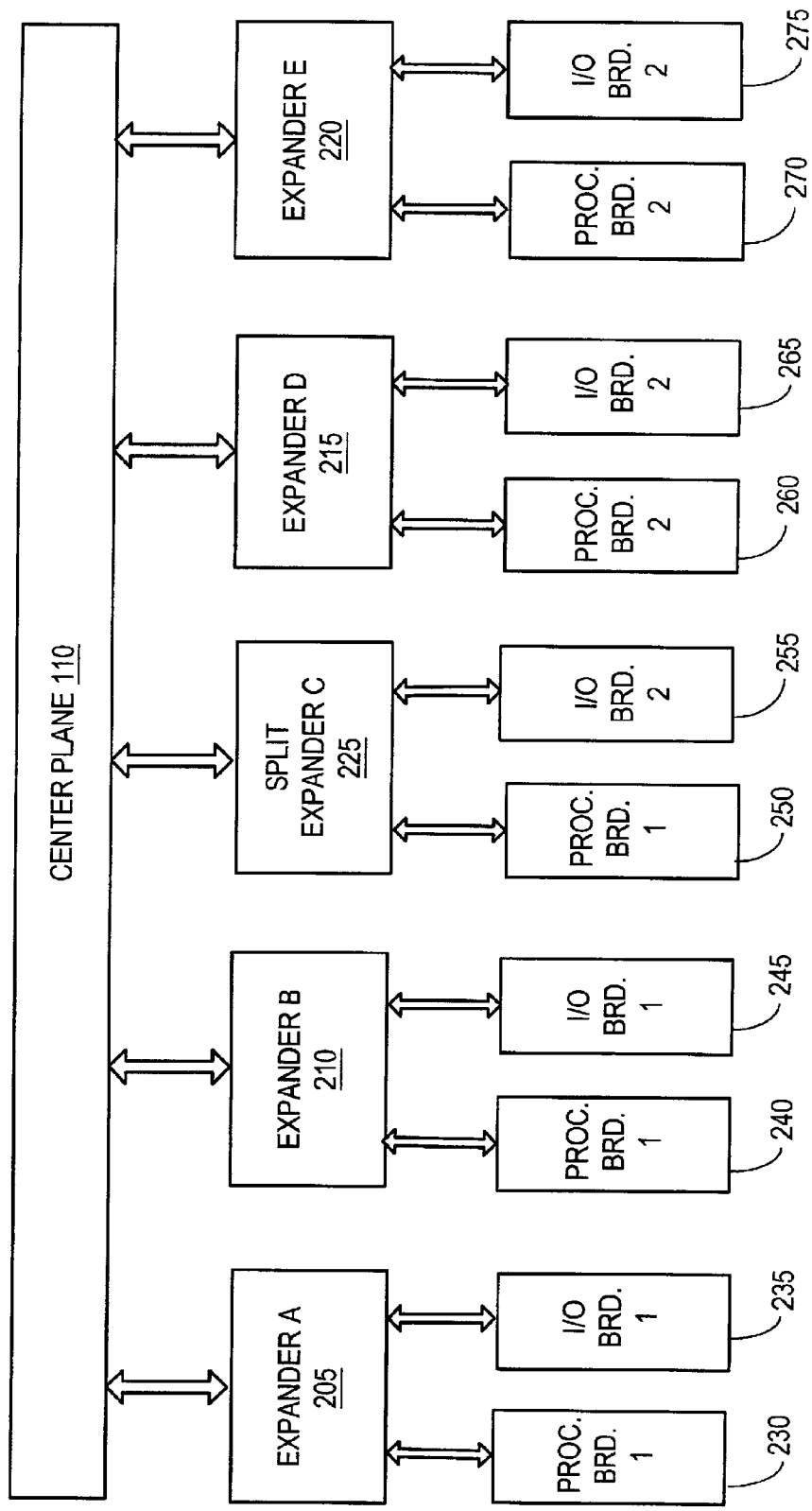
FIG. 2 shows a block diagram of an exemplary domain configuration, which may be employed in the system of FIG. 1, according to one embodiment of the present invention.

Turning now to FIG. 2, a block diagram of an exemplary domain configuration, which may be employed in the system of FIG. 1, according to one embodiment of the present invention, is shown. According to this embodiment, the system resources of the computer system 100 are divided into two domains under the control of the system controller boards 102, 105. The first domain is identified by the numeral "1," and the system resources (e.g., processor boards 125, I/O boards 130, etc.) that are allocated to the first domain are labeled accordingly. The second domain is identified by the numeral "2," and its corresponding grouping of system resources are labeled by the numeral "2."

As shown in FIG. 2, expander boards 205, 210 (i.e., expanders A and B) are each associated by the primary system controller board 102 with processor boards 230, 240 and I/O boards 235, 245 that are allocated within domain 1. Expander boards 215, 220 (i.e., expanders D and E) are each associated by the primary system controller board 102 with processor boards 260, 270 and I/O boards 265, 275 that are allocated within domain 2. As previously discussed, each domain defines a particular grouping of system resources within the computer system 100 to perform a particular task or set of tasks, which the domain is formed to accomplish.

When the expander board 135 is interfaced with a processor board 125 and I/O board 130 within the same domain, it is referred to as a "non-split" expander or a "non-split" slot. In the particular example provided in FIG. 2, the expander boards 205, 210 and the expander boards 215, 220 are non-split expanders because they are interfaced with system resources from a single domain. For example, the expander boards 205, 210 respectively interface with the processor boards 230, 240 and the I/O boards 235, 245 from the same domain (i.e., domain 1). Likewise, the expander boards 215, 220 interface with the processor boards 260, 270 and the I/O boards 265, 275 from the same domain (i.e., domain 2). The expander board 225 (i.e., expander C), on the other hand, interfaces with system resources from differing domains. That is, the expander board 225 is interfaced with the processor board 250 from domain 1 and the I/O board 255 from domain 2. When the expander board 135 is interfaced with system resources from differing domains, it is referred to as a "split" expander or "split" slot. Accordingly, in the example provided in FIG. 2, the expander board 225 is a split expander.

A domain may be formed of an entire system board set 120, one or more boards (e.g., processor board 125, I/O board 130) from selected system board sets 120, or a combination thereof. Additionally, it will be appreciated that physical proximity of the boards is not necessary to be within a particular domain. It will further be appreciated that the number of domains need not necessarily be limited to two as shown in the example of FIG. 2, but may include several additional domains. For example, it is conceivable for each system board set 120 within the system 100 to form its own respective domain. Alternatively, all system board sets 120 may form a single domain. It will also be appreciated that several other arrangements of the system resources may be formed, and, thus, need not be limited to the particular arrangement of system resources as illustrated in FIG. 2.

In accordance with the illustrated embodiment of the present invention, the system 100 is configured to perform intra-domain communication, i.e., communication solely within domain 1 and communication solely within domain 2, but not between domains 1 and 2. Typically, with intra-domain communication within the computer system 100, the transactions that occur in one domain on a non-split expander board do not affect the transactions that occur in the other domain because the expander board 135 interfaces solely with processor and/or I/O boards 125, 130 within one domain (i.e., either domain 1 or domain 2). Thus, the transactions for the processor board 250 (shown in FIG. 2) of domain 1 and the I/O board 255 of domain 2 that are coupled to the split expander 225 are independent of one another, i.e., communication occurs solely between the system resources within domain 1 and solely between the system resources of domain 2.

With the split expander board 225, however, intra-domain communication of one domain may be adversely affected if the other domain is "down" (i.e., has failed). That is, because the split expander board 225 handles transactions for both domains, if one domain goes down (such as domain 1, for example), it may adversely affect the operation of the other domain (i.e., domain 2) sharing the split expander board 225. Accordingly, if the system resources for one domain go down, the system resources for the other domain may go down as well because of the two independent domains sharing the same expander board 135. The primary system controller board 102 handles the reconfiguration within the failed domain without affecting other domains to the extent possible (e.g., when no split expander board 225 is involved).

Figure 3:
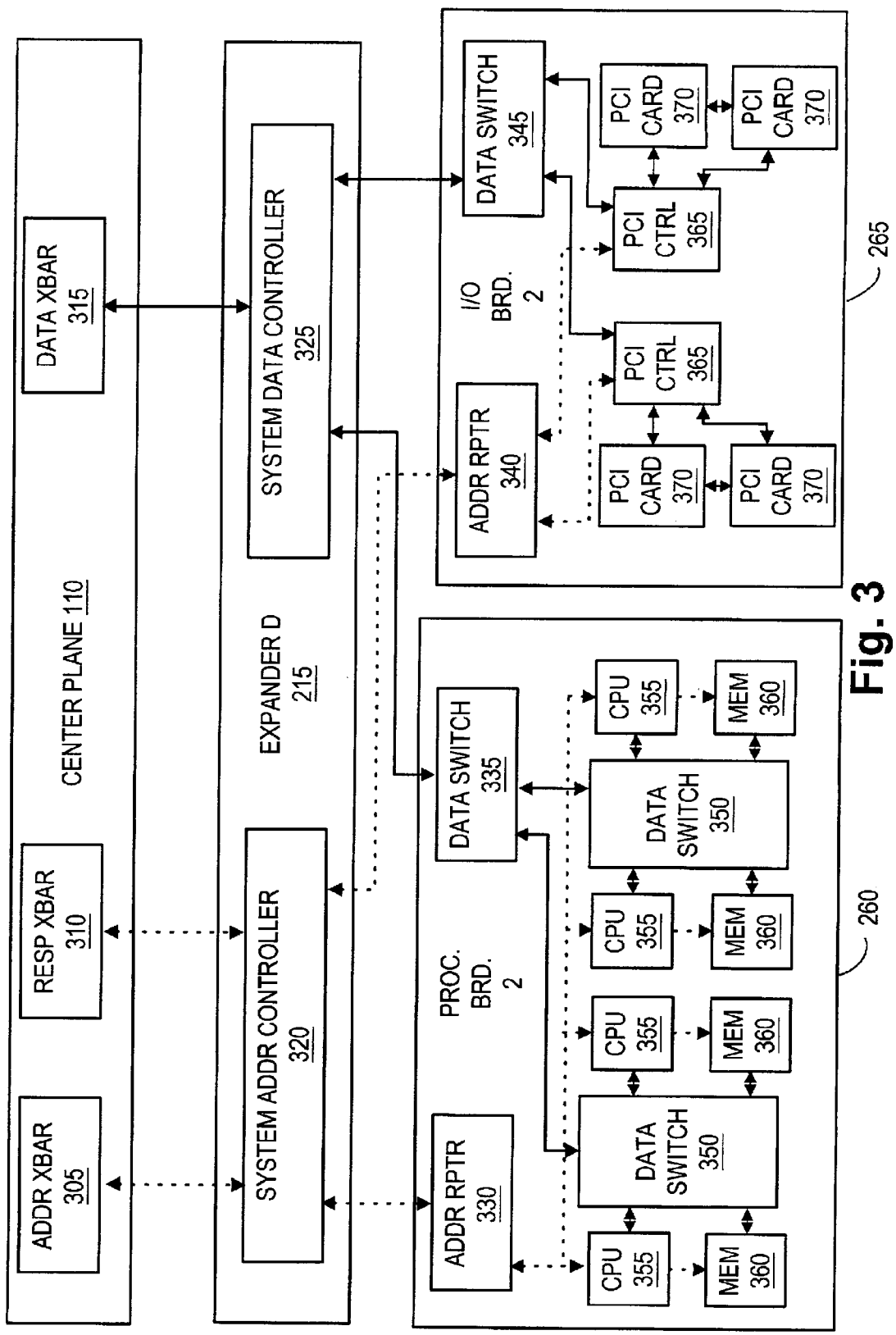
FIG. 3 illustrates a block diagram showing address and data flow in an exemplary system board set coupled to a center plane, according to one embodiment of the present invention.

Turning now to FIG. 3, a block diagram of an exemplary system board set (expander board D 215, processor board 260, I/O board 265) coupled to the center plane 110, according to one embodiment of the present invention, is shown. The center plane 110 includes an address crossbar 305, a response crossbar 310, and a data crossbar 315. The expander board D 215 includes a system address controller 320 and a system data controller 325. The system address controller 320 is coupled to the address crossbar 305 and the response crossbar 310. The system data controller 325 is coupled to the data crossbar 315.

The illustrated embodiment of the processor board 260 includes an address repeater 330, a data switch 335, a plurality of processors (CPUs) 355, a plurality of memories 360, and a plurality of data switches 350. The address repeater 330 is coupled to receive address information from the system address controller 320. The address repeater 330 is also coupled to transmit address information to one or more CPUs 355. The data switch 335 is coupled to receive data from the system data controller 325. Each CPU 355 is coupled to receive address information from the address repeater 330 and provide address information to a respective memory 360. Each data switch 350 is coupled to receive data through the data switch 335. Each data switch 350 is also coupled to provide data to a plurality of the CPUs 355 and a plurality of the memories 360.

The illustrated embodiment of the I/O board 265 includes an address repeater 340, a data switch 345, a plurality of I/O controllers (e.g., PCI controllers) 365, and a plurality of I/O cards (e.g., PCI cards) 370. The address repeater 340 is coupled to receive address information from the system address controller 320. The address repeater 340 is also coupled to transmit address information to each PCI controller 365. The data switch 345 is coupled to receive data from the system data controller 325. Each PCI controller 365 is coupled to receive address information from the address repeater 340 and provide address information to a respective plurality of PCI cards 370. Each PCI controller 365 is also coupled to receive data through the data switch 345 and provide data to the respective plurality of PCI cards 370. Each of the respective plurality of PCI cards 370 is additionally configured to share data directly. In one embodiment, each of the plurality of PCI cards 370 is placed in a hot swappable PCI cassette (not shown) for ease of removal and replacement.

Figure 4:
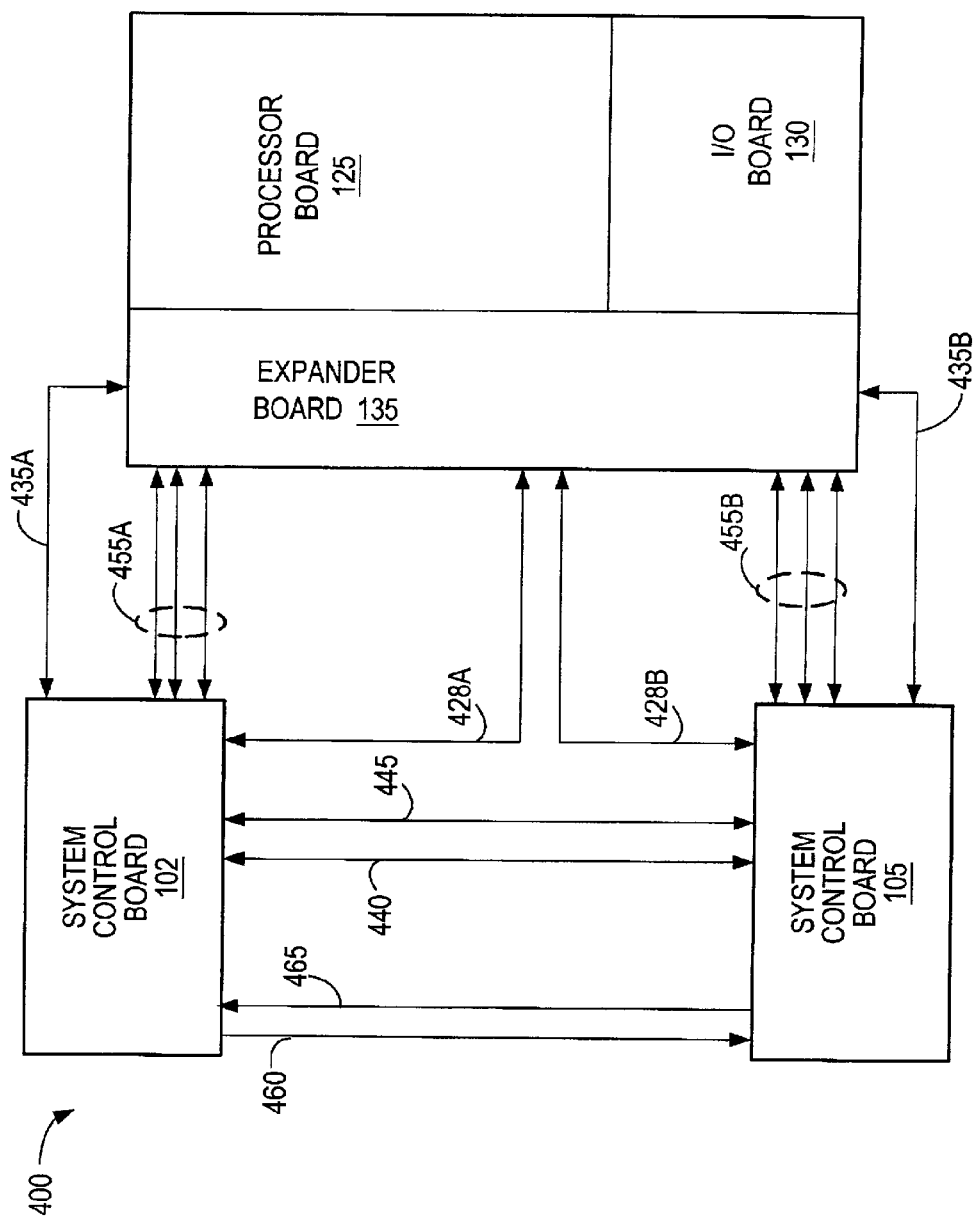
FIG. 4 illustrates a functional block diagram of redundant interconnections among an exemplary system board set and two system controller boards, according to one embodiment of the present invention.

Referring to FIG. 4, a functional block diagram 400 of redundant interconnections among the exemplary system board set 120 and two system controller boards 102 and 105, according to one embodiment of the present invention, is shown. The block diagram 400 includes the primary system controller board 102, the secondary system controller board 105, and the system board set 120, which includes the processor board 125, the I/O board 130, and the expander board 135.

The primary system controller board 102 is connected to the secondary system controller board 105 through an IIC (Inter-Integrated Circuit) link 460 sourced on the primary system controller board 102, an IIC link 465 sourced on the secondary system controller board 105, and Ethernet links 440 and 445. The primary system controller board 102 is connected to one or more expander boards 135 in the computer system 100 through a console bus 428A as well as a plurality of IIC links 455A. The primary system controller board 102 is also connected to one or more I/O boards 130 in the computer system 100 through Ethernet link 435A. The secondary system controller board 105 is connected to one or more expander boards 135 in the computer system 100 through a console bus 428B as well as a plurality of IIC links 455B. The secondary system controller board 105 is also connected to one or more I/O boards 130 in the computer system 100 through Ethernet link 435B.

Figure 5:
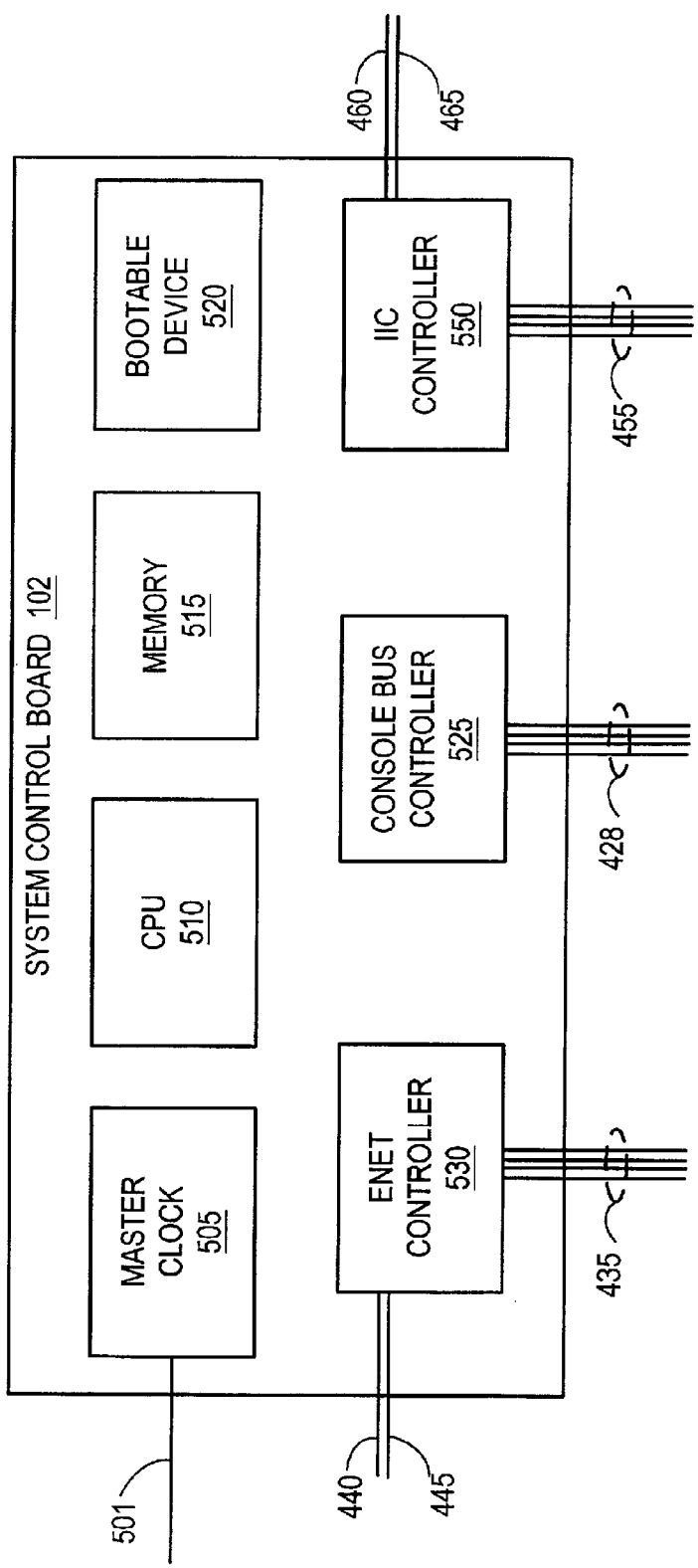
FIG. 5 illustrates an exemplary system controller board, according to one embodiment of the present invention.

Referring to FIG. 5, an embodiment of the system controller board 102, according to one embodiment of the present invention, is shown. In the embodiment of the computer system 100 shown in FIG. 1, the system controller board 105 is identical to the system controller board 102, although not required for all embodiments of the present invention.

The system controller board 102 includes a master clock generator 505, a processor (CPU) 510, a memory 515, a bootable device 520, a first communications controller (e.g., Ethernet, token ring, etc.) 530, a console bus controller 525, and a second communications controller (e.g, IIC, System Management Bus, etc.) 550. A plurality of communications links (e.g., configured as 100BaseTX Ethernet) 435, 440, 445 is connected to the Ethernet controller 530. The plurality of Ethernet links 435 is configurable to couple to the plurality of I/O boards 130 in the computer system 100. The Ethernet links 440 and 445 are configurable to connect to another system controller board (e.g., 105). In the illustrated embodiment, the console bus 428 is an 8-bit wide monitoring and control bus with a separate link coupled to each expander board 135. Other bus widths for the console bus 428 are contemplated. A plurality of communications links (e.g., two-wire serial lines) 455, 460, 465 is connected to the IIC controller 550. The plurality of IIC links 455 is configurable to couple to or through the plurality of expander boards 135. The IIC links 460 and 465 are configurable to connect to and from another system controller board (e.g., 105), respectively.

The master clock generator 505 outputs a master clock signal to be routed over clock line 501 to each of the various components of the computer system 100 that requires the master clock signal. Any implementation of clock production and distribution known in the art is contemplated.

The processor 510 executes an operating system and program code that, along with optional firmware and the hardware of the computer system 100, control the computer system 100. The processor 510 and the memory 515 may be implemented as desired using, for example, a SPARC® chip 510 and any variety of DRAM (dynamic random access memory) 515, as are well known in the art. SPARC® refers to products based on an architecture developed by SUN MICROSYSTEMS.

The operating system is loaded from the bootable device 520. The bootable device 425 may be a SCSI (Small Computer Systems Interface, ANSI X3.131-1986) storage device such as a hard disk drive, or other device configured to initialize the operating system, as is well known in the art. A controller and/or interface for the bootable device 425 are well known in the art and for brevity will not be described herein.

The Ethernet controller 530 may be implemented using a RIO™ ASIC (Application Specific Integrated Circuit). The RIO™ ASIC 545, available from SUN MICROSYSTEMS, is a high performance I/O controller chip including an IEEE 802.3 MAC (Media Access Controller). The console bus controller 525 and the IIC controller 550 may be implemented using ASICs configured for those purposes.

Figure 6:
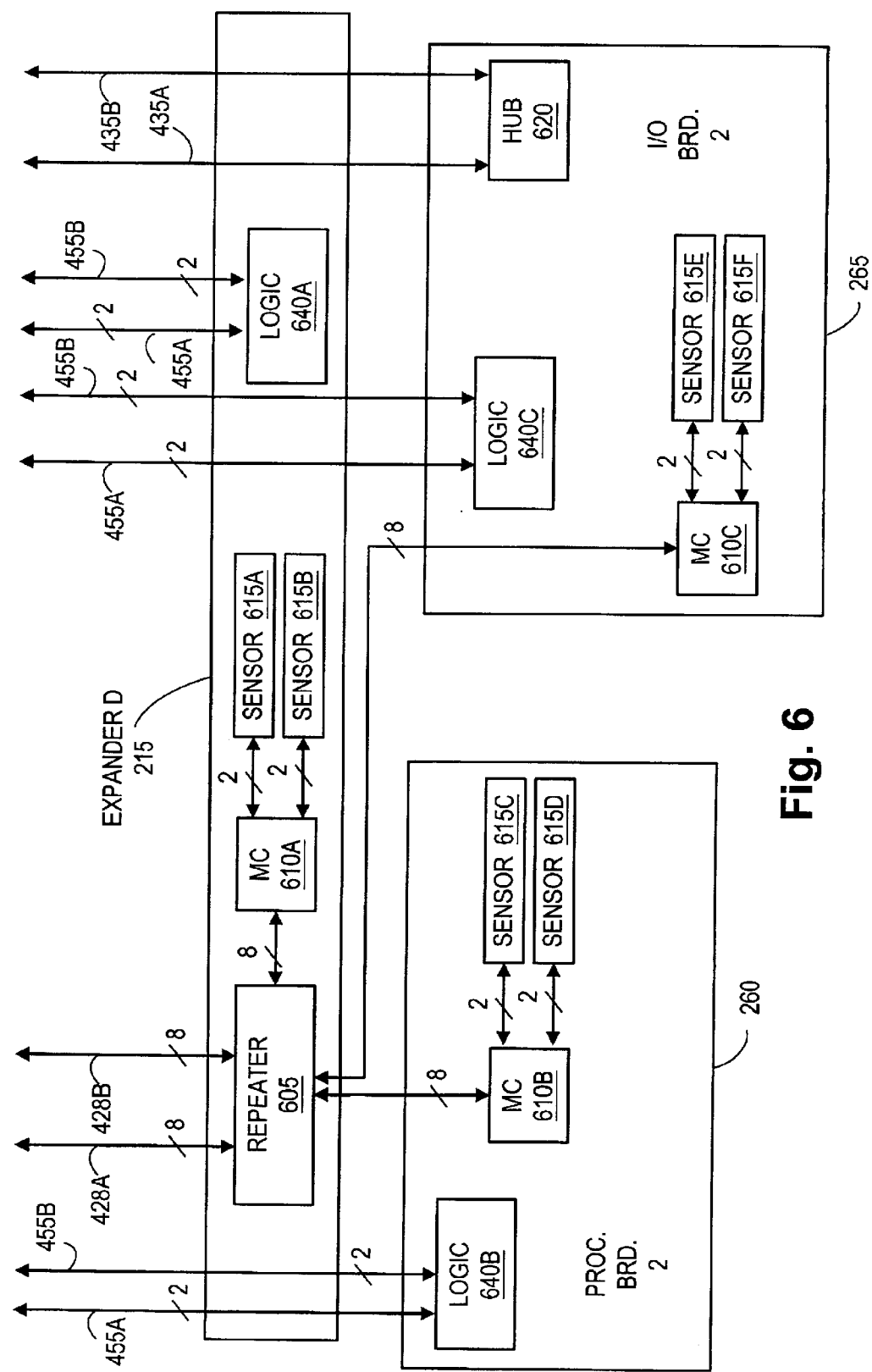
FIG. 6 illustrates a block diagram showing control and monitoring data flow in the exemplary system board set, according to one embodiment of the present invention.

Turning now to FIG. 6, a block diagram showing control and monitoring signal paths in the exemplary system board set of FIG. 3, according to one embodiment of the present invention, is shown. An IIC link 455A from the primary system controller board 102 and an IIC link 455B from the secondary system controller board 105 connect to logic 640A on the expander board 215. A console bus 428A from the primary system controller board 102 and a console bus 428B from the secondary system controller board 105 connect to a repeater 605 on the expander board 215. A console bus link extends from the repeater 605 to a monitoring chip (MC) 610A on the expander board 215. One or more IIC links extend from the monitoring chip 610A to one or more sensors 615. Two sensors 615A and 615B are shown on the expander board 215, however, those skilled in the art will appreciate that more or fewer sensors may be used, as dictated by the number and type of parameters being sensed.

Another console bus link extends from the repeater 605 to a monitoring chip (MC) 610B on the processor board 260. One or more IIC links extend from the monitoring chip 610B to one or more sensors 615. Two sensors 615C and 615D are shown on the processor board 260. An IIC link 455A from the primary system controller board 102 and an IIC link 455B from the secondary system controller board 105 couple through the expander board 215 to logic 640B on the processor board 260.

Another console bus link extends from the repeater 605 to a monitoring chip (MC) 610C on the I/O board 265. One or more IIC links extend from the monitoring chip 610C to one or more sensors 615. Two sensors 615E and 615F are shown on the I/O board 265. An IIC link 455A from the primary system controller board 102 and an IIC link 455B from the secondary system controller board 105 couple through the expander board 215 to logic 640C on the I/O board 265. The Ethernet link 435A from the primary system controller board 102 and the Ethernet link 435B from the secondary system controller board 105 couple through the expander board 215 to a hub 620 on the I/O board 265.

The logic 640A, 640B, and 640C may be implemented as power monitoring and control circuits. Other circuits, such as for temperature monitoring and control, etc., are also contemplated. The monitoring chips 610A, 610B, and 610C may be differentiated based on where (i.e., board 215, 260, or 265) the MC 610 is placed. On the expander board 215, the monitoring chip 610A may monitor and/or control temperature, data throughput, data routing, and the like. On the processor board 260, the monitoring chip 610B may monitor and/or control booting configurations, routing configurations, reconfiguration, and the like. On the I/O board 265, the monitoring chip 610C may monitor and/or control booting configurations, routing configurations, reconfiguration, data throughput, and the like. The sensors 615A–615F are appropriate to the respective function or device to be monitored. Note that additional control lines (not shown) may be routed on the expander board 215, the processor board 260, and/or the I/O board 265 from the respective monitoring chip 610 as needed. Note that the logic 640A, 640B, and 640C may be discrete logic or an integrated circuit and may also be referred to herein as monitoring chips, control chips, and/or sensors, or the like.

The plurality of IIC links from the MC 610A, the MC 610B, and MC 610C may transfer JTAG signals transmitted over the console bus links 428A and 428B. JTAG signals are well known in the art, referring to IEEE Standard 1149.1-1990 Test Access Port and Boundary-Scan Architecture and successors for the testing of internal interconnections. A memory (not shown), such as a SEEPROM (Serial Electrically Erasable Programmable ROM) configured with manufacturing information, serial numbers, and/or configuration data, may be coupled to one of the IIC links. Note that the plurality of communication links 455, 560, 465 may be implemented using any desired protocol and is not restricted to the two-wire serial connections and protocols (ie., IIC, etc.) described herein.

Figure 7:
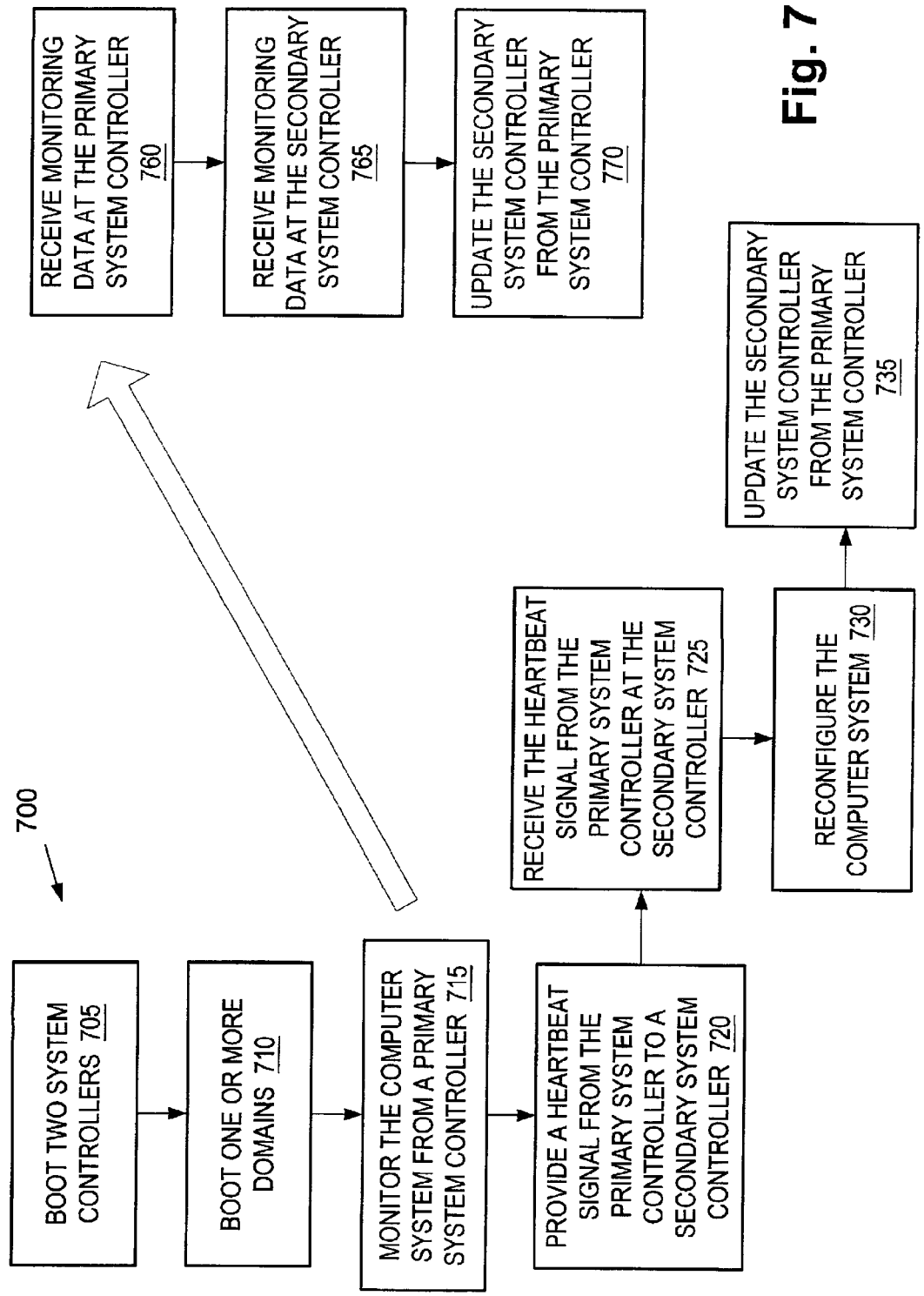
FIG. 7 shows a flowchart of a method of operating a computer system, according to one embodiment of the present invention.

Turning now to FIG. 7, a flowchart of a method 700 of operating a computer system 100 such as shown in FIG. 1, according to one embodiment of the present invention, is shown. The method 700 includes booting two system controllers 102, 105 in the computer system 100, in block 705. There may be more system controllers 102, 105 also booted in block 705. The method 700 also includes booting one or more domains in the computer system 100, in block 710.

The one or more domains may be booted by, or under the control of, the primary system controller 102. The method 700 includes monitoring the computer system 100, in block 715. Monitoring the computer system 100 may include receiving monitoring data at the primary system controller 102, in block 760. Monitoring the computer system 100 may also include receiving monitoring data at the secondary system controller 105, in block 765. Monitoring the computer system 100 may also include updating the secondary system controller 105 from the primary system controller 102, in block 770.

The method 700 also includes providing a heartbeat signal from the primary controller 102 to the secondary system controller 105, in block 720. The heartbeat signal may be provided at a predetermined interval. The heartbeat signal may be provided over one of the plurality of Ethernet links 440, 445 between the primary controller 102 and the secondary system controller 105.

The method 700 may also include reconfiguring the computer system 100, in block 730. The reconfiguration may be performed by, or under the control of, the primary system controller 102. The reconfiguration may include creating, removing, and/or reconfiguring domains in the computer system 100. The reconfiguration may also include modifying connections, monitoring, and/or control functions in the computer system 100. The method also includes updating the secondary system controller 105 from the primary system controller 102, in block 735. Updating the secondary system controller 105 may include updating a system configuration stored at the secondary system controller 105.

Figure 8:
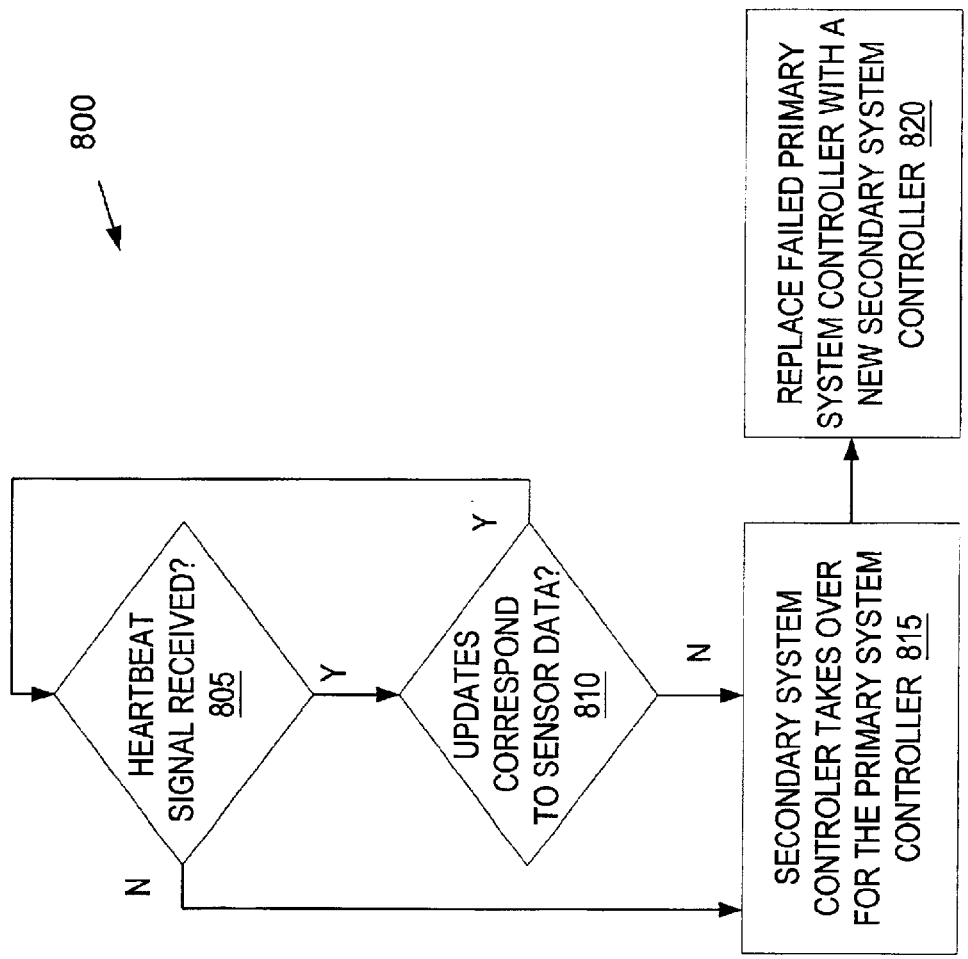
FIG. 8 shows a flowchart of a method of failover between system controllers, according to one embodiment of the present invention.

Turning now to FIG. 8, a flowchart of a method 800 of fail over between system controllers 102, 105 in a computer system 100, such as shown in FIG. 1, according to one embodiment of the present invention, is shown. The method 800 includes determining if the heartbeat signal has been received at the secondary system controller 105, in decision block 805. If the heartbeat signal has been received, then the method 800 continues with decision block 810. If the heartbeat signal has not been received, then the method 800 continues with block 815.

In decision block 810, the method 800 determines if the updates correspond to the sensor data. The updates include changes to the system configuration stored at the secondary system, controller 105. The sensor data includes data received from the sensors 615. If the updates correspond to the sensor data, then the method 800 may return to decision block 805. If the updates do not correspond to the sensor data, then the method moves to block 815.

In block 815, the method 800 includes the secondary system controller 105 taking over the operations of the primary system controller 102. The secondary system controller 105 has determined that the primary system controller 102 has failed. The method 800 optionally includes replacing the failed primary system controller 102, from block 815, with a new secondary system controller 105. The original secondary system controller 105 is now the new primary system controller 102.

According to one embodiment of the present invention, monitoring and control of the computer system 100 are substantially continuous due to the fail over of the system controller functions from the primary system controller 102 to the secondary system controller 105. The failed primary system controller 102 may then be replaced with the new secondary system controller 105. Additionally, redundant monitoring and control links 440, 445, 460, 465, etc. may allow for the fail over between the primary system controller 102 and the secondary system controller 105 5 to be seamless to the operations of the computer system 100.

Note that user intervention may force a failure of the primary system controller 102. The secondary system controller 105 will then take over for the "failed" primary system controller 102. The "failed" primary system controller may then be removed as desired. As there is no physical failure of the "failed" primary system controller 102, the "failed" primary system controller 102 may then be reinitialized as the new secondary system controller 105. The user may thus reverse the roles of the primary system controller 102 and the secondary system controller 105, as desired.

Note that while the methods 700, 800 of the present invention disclosed herein have been illustrated as flowcharts, various elements of the flowcharts may be omitted or performed in a different order in various embodiments. Note also that the methods 700, 800 of the present invention disclosed herein admit to variations in implementation.

Some aspects of the present invention, as disclosed above, may be implemented in hardware, firmware, or software. Thus, some portions of the detailed descriptions herein are consequently presented in terms of a hardware implemented process and some portions of the detailed descriptions herein are consequently presented in terms of a software-implemented process involving symbolic representations of operations on data bits within a memory of a computing system or computing device. These descriptions and representations are the means used by those in the art to convey most effectively the substance of their work to others skilled in the art using both hardware and software. The process and operation of both require physical manipulations of physical quantities. In software, usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer system, comprising:
   one or more sensors;
   a plurality of system controllers, each comprising:
   a processor;
   a memory; and
   a plurality of input/output (I/O) controllers each configurable with a plurality of I/O connections to another of the plurality of system controllers, wherein each of the plurality of I/O controllers is further configurable with an I/O connection to each of one or more sensors;
   wherein the plurality of system controllers includes a primary system controller and a secondary system controller;
   one or more processors;
   one or more memories; and
   one or more I/O devices;
   wherein the primary system controller is configured to configure the one or more processors, the one or more memories, and the one or more I/O devices into one or more domains,
   wherein the primary system controller is further configured to update secondary system controller with a system configuration.

2. The computer system of claim 1, wherein one of the plurality of I/O controllers includes an Ethernet controller.

3. The computer system of claim 2, wherein a second one of the plurality of I/O controllers includes an IIC controller.

4. The computer system of claim 1, wherein one of the plurality of I/O controllers includes an IIC controller.

5. The of claim 1, wherein the processor comprised in each system controller executes software configured to monitor the one or more sensors over the I/O connections to each of the one or more sensors.

6. The computer system of claim 5, further comprising:
   a device associated with a sensor of the one or more sensors;
   wherein the software is further configured to update a configuration of the device associated with the sensor in response to data received from the sensor.

7. The computer system of claim 6, wherein the software is further configured to update the one or more secondary system controllers with the configuration of the device associated with the sensor.

8. The computer system of claim 6, further comprising:
   a memory associated with the device associated with the sensor, wherein the memory is configured to store configuration data for the device;
   wherein the software is further configured to update the memory associated with the device associated with the sensor over the I/O connection.

9. The computer system of claim 1, wherein each system controller further comprises:
   a bootable device.

10. The computer system of claim 9, wherein the bootable device of each respective system controller is configured to store an operating system executable by the processor comprised in the respective system controller, wherein the bootable device is further configured to store software including instructions that configure the processor comprised in the respective system controller to monitor the sensors.

11. A method of operating a computer system, the method comprising:
    booting a plurality of system controllers configured as a primary system controller and at least one secondary system controller;
    booting one or more domains in the computer system from the primary system controller;
    updating a system configuration on the primary system controller; and
    updating the system configuration on the secondary system controller from the primary system controller;
    monitoring the computer system from the primary system controller; and
    monitoring the computer system from the secondary system controller;
    wherein monitoring the computer system from the secondary system controller comprises monitoring at least one of the one or more domains from the secondary system controller.

12. The method of claim 11, wherein monitoring the computer system from the primary system controller further comprises monitoring at least one of the one or more domains from the primary system controller.

13. The method of claim 11, further comprising:
    providing a heartbeat signal from the primary system controller to the secondary system controller.

14. The method of claim 13, wherein providing the heartbeat signal from the primary system controller to the secondary system controller comprises providing the heartbeat signal from the primary system controller to the secondary system controller at a predetermined interval.

15. The method of claim 13, further comprising:
    receiving the heartbeat signal from the primary system controller at the secondary system controller.

16. A method of operating a computer system, the method comprising:
    booting a plurality of system controllers configured as a primary system controller and at least one secondary system controller;

booting one or more domains in the computer system from the primary system controller;

updating a system configuration on the primary system controller;

updating the system configuration on the secondary system controller from the primary system controller;

providing a heartbeat signal from the primary system controller to the secondary system controller;

failing to receive the heartbeat signal from the primary system controller at the secondary system controller;

determining that the primary system controller is a failed primary system controller, in response to failing to receive the heartbeat signal from the primary system controller at the secondary system controller; and replacing the failed primary system controller with the secondary system controller as the primary system controller, in response to determining that the primary system controller is the failed primary system controller.

17. The method of claim 16, further comprising:

removing the failed primary system controller; and replacing the failed primary system controller with a secondary system controller.

18. The method of claim 16, further comprising:

monitoring the computer system from the primary system controller.

19. A computer readable medium encoded with instructions that, when executed by a computer system, performs a method for operating the computer system, the method comprising:

booting a plurality of system controllers configured as a primary system controller and at least one secondary system controller;

booting one or more domains in the computer system from the primary system controller;

updating a system configuration on the primary system controller;

updating the system configuration on the secondary system controller from the primary system controller;

monitoring the computer system from the primary system controller;

monitoring the computer system from the secondary system controller; and wherein monitoring the computer system from the secondary system controller comprises monitoring at least one of the one or more domains from the secondary system controller.

20. The computer readable medium of claim 19, wherein monitoring the computer system from the primary system controller further comprises monitoring at least one of the one or more domains from the primary system controller.

21. The computer readable medium of claim 19, the method further comprising:

providing a heartbeat signal from the primary system controller to the secondary system controller.

22. The computer readable medium of claim 21, wherein providing the heartbeat signal from the primary system controller to the secondary system controller comprises providing the heartbeat signal from the primary system controller to the secondary system controller at a predetermined interval.

23. The computer readable medium of claim 21, the method further comprising:

receiving the heartbeat signal from the primary system controller at the secondary system controller.

24. A computer readable medium encoded with instructions that, when executed by a computer system. performs a method for operating the computer system, the method comprising:

booting a plurality of system controllers configred as a primary system controller and at least one secondary system controller;

booting one or more domains in the computer system from the primary system controller;

updating a system configuration on the primary system controller;

updating the system configuration on the secondary system controller from the primary system controller;

providing a heartbeat signal from the primary system controller to the secondary system controller;

failing to receive the heartbeat signal from the primary system controller at the secondary system controller;

determining that the primary system controller is a failed primary system controller, in response to failing to receive the heartbeat signal from the primary system controller at the secondary system controller; and replacing the failed primary system controller with the secondary system controller as the primary system controller, in response to determining that the primary system controller is the failed primary system controller.

25. The computer readable medium of claim 24, the method further comprising:

removing the failed primary system controller; and replacing the failed primary system controller with a secondary system controller.

26. The computer readable medium of claim 24, the method further comprising:

monotoring the computer system from the primary system controller.

* * * * *